United States Patent Office 3,504,248
Patented Mar. 31, 1970

3,504,248
DUAL CHANNEL SERVO SYSTEM HAVING TORQUE EQUALIZATION
Harry Miller, Scottsdale, Ariz., assignor to Sperry Rand Corporation, a corporation of Delaware
Filed May 10, 1967, Ser. No. 637,462
Int. Cl. H02p 7/68
U.S. Cl. 318—18     9 Claims

ABSTRACT OF THE DISCLOSURE

Apparatus for controlling a common load member in which two substantially identical first and second parallel servo channels provide first and second outputs to a differential gear means disposed at a reversible point in the control system. Position and rate feedback means responsive to the movement of the differential gear means provide position and rate feedback signals to the first and second servo channels to provide for combining, equalizing and transferring the torque loads between the servo channels.

BACKGROUND OF THE INVENTION

Field of the invention

The present invention pertains to parallel servo systems which drive a common load member such as in automatic landing systems where two identical flight control channels are integrated to drive a common control surface.

Description of the prior art

Prior art parallel servo systems which drive a common load member usually require complex equalizing circuitry to assure equal division of the load between the two servo systems and to achieve reliability of the over-all system. Further, when failure occurred in one of the prior art channels, transfer transients occurred when the remaining channel endeavored to carry the entire load necessitating complex gain compensation. Alternatively, a previously inoperative standby channel was placed into operation which itself may malfunction or result in serious transfer transients which are particularly undesirable when in the final stages of an automatic landing. The prior art dual channel systems usually require either a common power supply or synchronization between independent power supplies. The later is complex and expensive while a failure of the former causes the entire system to become inoperative.

SUMMARY OF THE INVENTION

The present invention provides a control system for controlling a common load member in which two substantially identical first and second parallel servo channels provide first and second outputs to a differential gear means disposed at a reversible point in the control system. Position and rate feedback means responsive to the movement of the differential gear means provide position and rate feedback signals to the first and second servo channels to provide for combining, equalizing and transferring the torque loads between the servo channels. The present invention provides the following advantages over prior art systems:

(1) The work performed by the two servos is equally divided without requiring electronic equalizing circuitry, thus improving over-all reliability of the system.

(2) The two servo systems have a maximum amount of electrical isolation, reducing the likelihood that a single electrical failure will cause failure of both systems.

(3) Transfer transients are minimized because the operating servo always carries the same torque whether operating singly or in parallel with the other servo.

(4) Mechanical failures in the common torque combining mechanism do not cause simultaneous failure of both systems.

(5) There is no requirement to change the gear ratio of the operational system after transfer of load.

(6) Both control channels aer identical to each other structurally and functionally since both normally operate in identical configurations with each carrying the same torque.

(7) In the event of failure of one channel the initial action of the operating channel is to cancel the spurious effect of the failed channel, thus further tending to reduce transfer transients.

BRIEF DESCRIPTION OF THE DRAWINGS

Referring now to the drawings.

DESCRIPTION OF THE PREFERRED EMBODIMENTS

Figure 1:
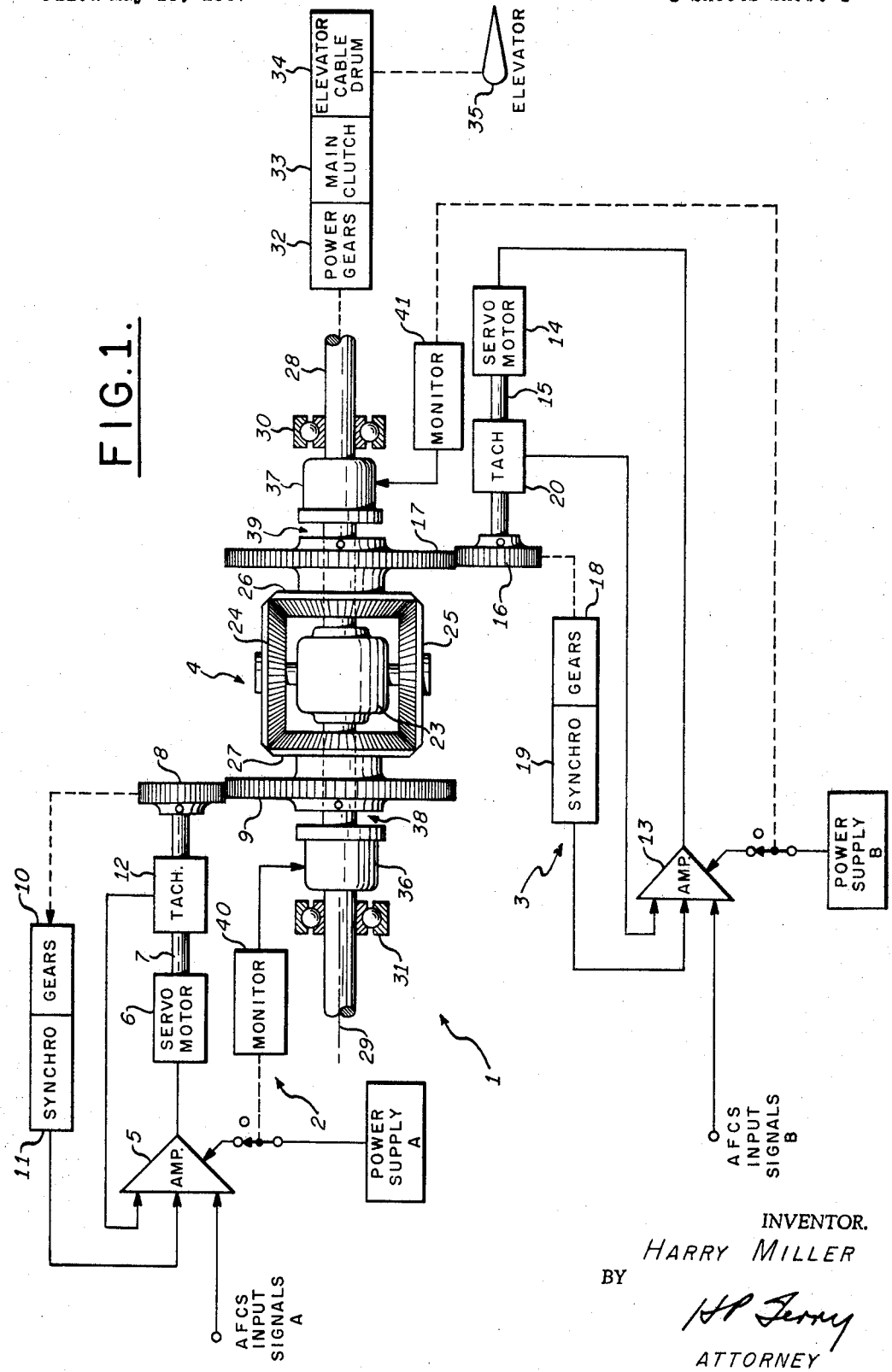
FIG. 1 is an electromechanical schematic drawing of a preferred embodiment of a dual channel flight control system incorporating the present invention.

The present invention will be described, for purposes of example, with respect to an automatic landing system for aircraft. As shown in FIG. 1, the automatic landing system 1 includes first and second substantially identical flight control or servo channels 2 and 3, respectively, which are integrated into a fail-operational automatic pilot by connecting their outputs to drive a differential gear 4 at a reversible point in the system 1 and by providing proper position and rate feedback signals in a manner to be more fully explained.

The servo channels 2 and 3 are connected in parallel with respect to each other. The servo channel 2 includes a servo amplifier 5 responsive to the usual input signals A from an automatic flight control system A indicated by the legend and energized by a power supply A. The servo amplifier 5 is connected to drive a servo motor 6 which has its output shaft 7 connected via a pinion gear 8 to an input gear 9 of the differential gear 4. A position feedback signal is provided by means of gearing 10 which is responsive to the rotation of the gear 8 for rotating a synchro transmitter 11 to provide a position feedback signal to an input terminal of the servo amplifier 5. A rate feedback signal representative of the speed of rotation of the gear 8 is provided by tachometer generator 12 coupled to the shaft 7 for providing a rate feedback signal to another input terminal of the servo amplifier 5.

In a similar manner, the servo channel 3 includes a servo amplifier 13 responsive to input signals B from an automatic flight control system B and energized by a power supply B. The servo amplifier 13 is connected to drive a servomotor 14 which has its output shaft 15 connected via pinion gear 16 to the opposite input gear 17 of the differential gear 4. A position feedback signal is provided by means of gearing 18 which is responsive to the rotation of the gear 16 for rotating a synchro transmitter 19 to provide a position feedback signal to an input terminal of the servo amplifier 13. A rate feedback signal representative of the speed of rotation of the gear 16 is provided by a tachometer generator 20 coupled to the shaft 15 for providing a rate feedback signal to another input terminal of the servo amplifier 13.

The outputs of the parallel servo channels 2 and 3 are summed in the differential gear 4 which comprises element 23, and bevel gears 24, 25, 26 and 27. The gear 9 is fixed to the gear 27 while the gear 17 is fixed to the gear 26 and in normal operation they rotate with respect to the shaft 28 about the shaft axis 29. The gears 24 and 25 are rotatably mounted on the element 23 for rotation about an axis perpendicular to the axis 29 for driving the element 23. The element 23 is fixed to the shaft 28 which in turn rotates in spaced bearings 30 and 31 around the axis 29. The output element 23 rotates the shaft 28 to drive power gears 31 which are connected through a main clutch 33 to the elevator cable drum 34 which in turn controls the position of the elevator control surface 35.

Two solenoid clutches 36 and 37 are also mounted for rotation with the shaft 28 and have respective clutch faces which are cooperative with matching clutch faces on the gears 9 and 17, respectively. The solenoid clutch 36 is normally energized to maintain a gap 38 between its clutch face and the cooperative clutch face on the gear 9 and similarly solenoid clutch 37 is normally energized to maintain a gap 39 between its clutch face and that on the gear 17 to permit the gears 27 and 26, respectively, to rotate relative to the shaft 28. The solenoid clutches 36 and 37 are spring loaded to close the gaps 38 and 39, respectively, when the solenoids are de-energized. When either clutch gap 38 or 39 is closed, the entire differential gear assembly 4 comprising the elements 23, 24, 25, 26, 27 and 28 will rotate as a locked unit with no relative motion between the named elements. A monitor 40 of conventional design is responsive to signals from the servo channel 2 for de-energizing the solenoid clutch 36 and disconnecting the power supply A to the servo amplifier 5 in the event of failure of the servo channel 2. Similarly, a conventional monitor 41 is responsive to signals from the servo channel 3 for de-energizing the solenoid clutch 37 and disconnecting the power supply B to the servo amplifier 13 in the event of failure of the servo channel 3. The monitors 40 and 41 may be generally of the type disclosed and to be explained subsequently with respect to FIG. 3.

In normal operation, both solenoid clutches 36 and 37 are energized and the servomotors 6 and 14 position the associated gears 9 and 17 in accordance with the electrical commands of the respective servo amplifiers 5 and 13. The combined input to each of the servo amplifiers 5 and 13 consisting of the algebraic summation of the respective automatic flight control system command, servo position feedback and servo rate feedback signals is of sufficient level to provide one-half the torque load through the differential gear 4 to the power gears 32. The gears 24 and 25 operate to insure that the total torque load provided by each of the servo channels 2 and 3 is divided equally. If the torque load provided by each servo channel 2 and 3 is not equal, the gears 24 and 25 will rotate causing the servo channel with the lesser torque load to be deflected in a direction which will change its position feedback voltage to increase its output while the servo channel with the greater load will be deflected in the direction to reduce its load. This action will continue until the torque load is divided equally between the servo channels 2 and 3.

If the output shaft 28 is required to be moved via the element 23, one-half of the motion will be supplied by the gear 26 while the other half will be supplied by the gear 27 and when equilibrium is obtained, the load will be still equally divided for the reasons explained above.

In the event of failure of one of the servo channels such as 2, for example, the monitor 40 will de-energize the solenoid clutch 36 and disconnect the power supply A to the servo amplifier 5. De-energizing the servo clutch 36 causes it to close the gap 38 which results in the entire differential gear assembly 4 rotating as a single locked unit with direct coupling through the servo channel 3 via servomotor 14, gears 16, 17, 26, 24 and 25, the element 23 and shaft 28 to the power gears 32. The servomotor 6 of the failed servo channel 2 having been disconnected from the power supply A will merely idle and be driven by the operational servomotor 14. It should be noted that the position feedback gearing including gears 16 and 18 of the operational servo channel 3 when operating alone is consistent with its configuration when the two servomotors 6 and 14 are sharing the load. The reason for this is that there is a 2:1 gear reduction between each of the servomotors 6 and 14 and the output shaft 28 when the differential gear 4 is operating normally and the output shaft 28 travels twice the equivalent distance of a single servomotor because each servomotor contributes equally to the total displacement. However, with the differential gear 4 locked because of the clamping action of the solenoid clutch 36, the gear reduction ratio between the operational servomotor 14 and the output shaft 28 is only half that of its unlocked configuration. This results in exactly the same gear ratio between the feedback synchro rotation and the output shaft 28 whether the differential gear 4 is locked or not.

It will be noted that mechanical jamming between the gear elements 24, 25, 26 and 27 will not affect the integrity of the output shaft 28 since the jammed assembly will rotate as a unit on the bearings 30 and 31. Either servomotor 6 or 14 is still available to rotate the shaft 28 in order to position the elevator 35.

The preceding description provides a mode of the operation in the event of failure in which the operative servo channel is still functioning to control the aircraft and may therefore be considered a fail-operational mode of operation. Alternatively, the system shown in FIG. 1 may also be utilized in a fail-steady mode of operation which is less complex than the system of FIG. 1 in that only a single monitored automatic flight control system channel is necessary. For example, referring to FIG. 1, assume that the AFCS input signals B are not used. However, the servo amplifier 13 and servomotor 14 are used in conjunction with the automatic flight control system input signals A and servo channel 2 which drive the servomotor 6.

In normal operation utilizing this configuration, the servomotor 14 with its position feedback to the servo amplifier 13 will act as a stiff reaction point for the differential gear 4, enabling the servomotor 6 to position the shaft 28 in accordance with command and feedback signals with respect to the servo channel 2. In the event of malfunction of the servo channel 2, the monitor 40 will de-energize the solenoid clutch 36 thereby clamping the entire differential gear 4. Under these conditions the servomotor 14 will hold the elevator control surface 35 from returning from its deflected position and thus eliminate disengage transients. These are particularly disturbing if failure should occur during flare and runway alignment maneuvers when the control surface 35 is being subjected to sizeable torques tending to streamline the surface positions.

Under the aforementioned conditions, in the event there is a failure in the holding servo channel 3 which drives the servomotor 14, it will be immediately detected by the monitor 40 of the servo channel 2 since, if the servomotor 14 fails to hold, it will be impossible for the servomotor 6 to drive through to the shaft 28. The lack of elevator control surface response to airplane disturbance will immediately trip the monitor 40 causing disengagement of the power supply A and thus the input signals A. Again, no disengagement transient will occur since it would have been impossible to maintain any torque on shaft 28 if the servomotor 14 was not holding as a reaction point for the inputs from the servomotor 6.

An alternative embodiment of the present invention is shown in FIG. 2 again, with respect to the elevator axis for purposes of example. Similar reference numerals will be used in FIG. 2 as used with respect to FIG. 1 to indicate generally similar apparatus. The automatic flight control system input signals are shown in the form of pitch rate $\theta$ and pitch computer signals which may for example be representative of pitch error $\Delta\theta$ and/or altitude error $\Delta h$. The parallel servo channels 2 and 3 include servomotors 6 and 14, respectively, which again operate into a mechanical differential gear 4 where the movements of the two servomotors 6 and 14 are added together. These motions are designated $\delta_1$ and $\delta_2$, respectively. The output of the differential is connected through gearing 32 and a clutch 33 to a cable drum 34 to drive the elevator 35.

In this configuration, the servomotor 6 has its output shaft 7 coupled to drive two tachometer generators 12 and 50. The output shaft 7 is also equipped with a brake solenoid 36 which is designed to hold the servomotor 6 locked when electrical power is removed from the solenoid brake 36. Gearing 10 driven by the shaft 7 rotates a pair of tandem synchros 11 and 51. The synchro 11 is a synchro transmitter while the synchro 51 is a control transformer. The monitor 40 controls the energization of the brake 36 and the servo amplifier 5.

With respect to the servo channel 3, the servomotor 14 has its output shaft 15 coupled to drive two tachometer generators 20 and 52. The output shaft 15 is also equipped with a brake 37 which is designed to hold the servomotor 14 locked when electrical power is removed from the solenoid brake 37. Gearing 18 driven by the shaft 15 rotates a pair of tandem synchros 19 and 53. The synchro 19 is a synchro transmitter while the synchro 53 is a control transformer. The monitor 41 controls the energization of the brake 37 and the servo amplifier 13.

In order to provide complete A.C. electrical isolation of the two servo channels 2 and 3, the tachometer generators and position feedback synchros are excited by two separate power supplies A and B which are not necessarily synchronized. The power supply A provides excitation for the tachometer generators 12 and 20 and the position feedback synchros 19 and 51 while the power supply B provides excitation for the tachometer generators 50 and 52 and the position feedback synchros 11 and 53. The pair of synchros comprising the synchro transmitter 11 and the control transformer 53 are electrically coupled and similarly the synchro pair comprising the synchro transmitter 19 and the control transformer 51 are electrically coupled to generate identical feedback signals each representing the sum of the two servomotor deflections. These signals designated $\delta_1+\delta_2$ are connected as feedback signals to input terminals of the servo amplifiers 5 and 13, respectively. The outputs of the tachometer generators 12 and 20 are connected to generate rate feedback signals that are representative of the rate of rotation of the individual servos and these signals are designated $\dot\delta_1$ and $\dot\delta_2$. The difference between the outputs of the tachometer generators 12 and 20 $\dot\delta_1-\dot\delta_2$ is connected in feedback fashion to another input terminal of the servo amplifier 5 preferably via an integrator 55. Similarly, the difference in the outputs of the tachometer generators 50 and 52, i.e., $\dot\delta_2-\dot\delta_1$, is connected in feedback fashion to an input terminal of the servo amplifier 13 preferably through an integrator 56. When steady state conditions are obtained, there is a standoff in the outputs of the channels such as to split the difference between their nulls.

Figure 2:
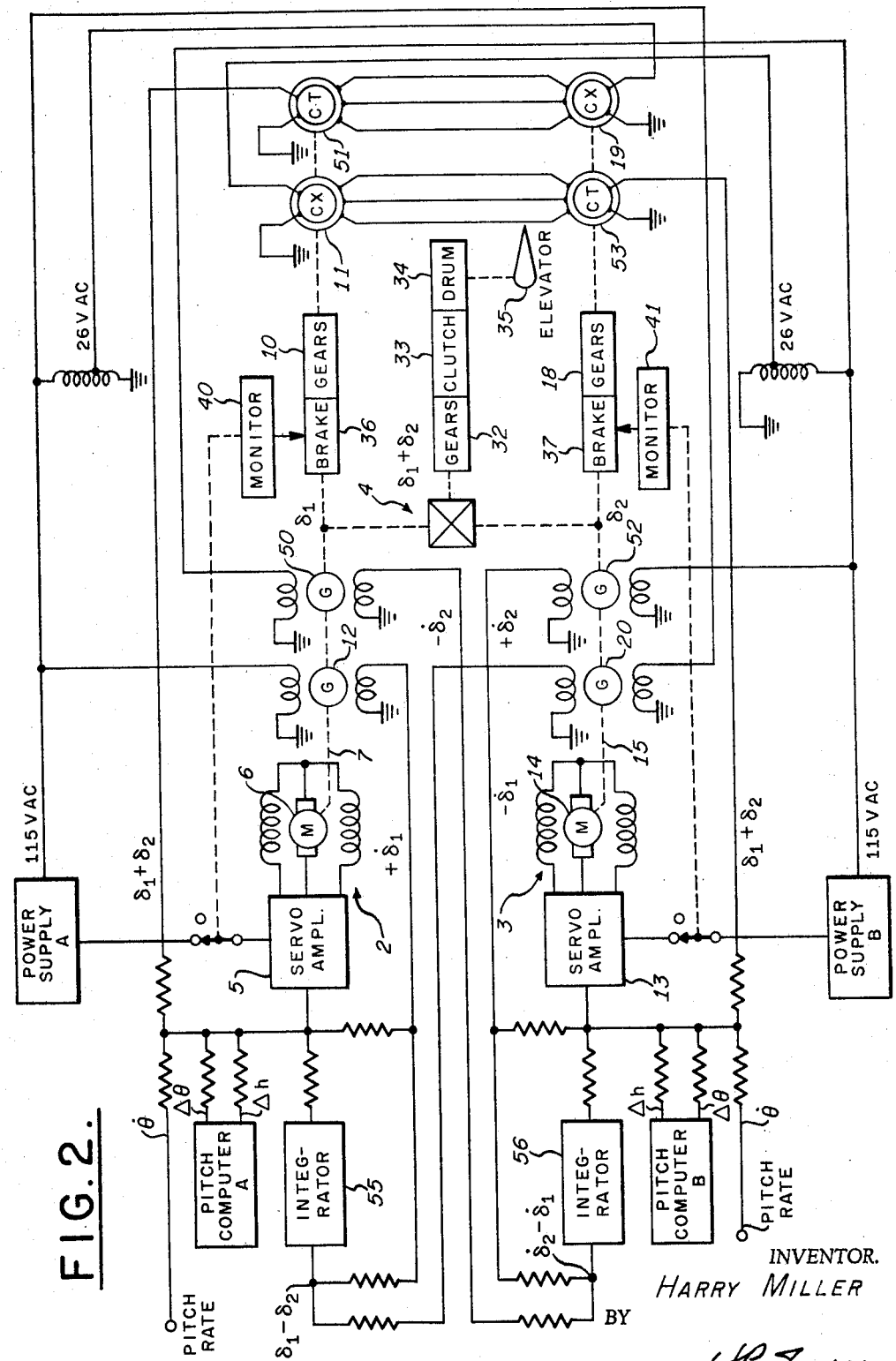
FIG. 2 is an electromechanical schematic drawing of an alternative preferred embodiment of a dual channel flight control system incorporating the present invention.
Figure 3:
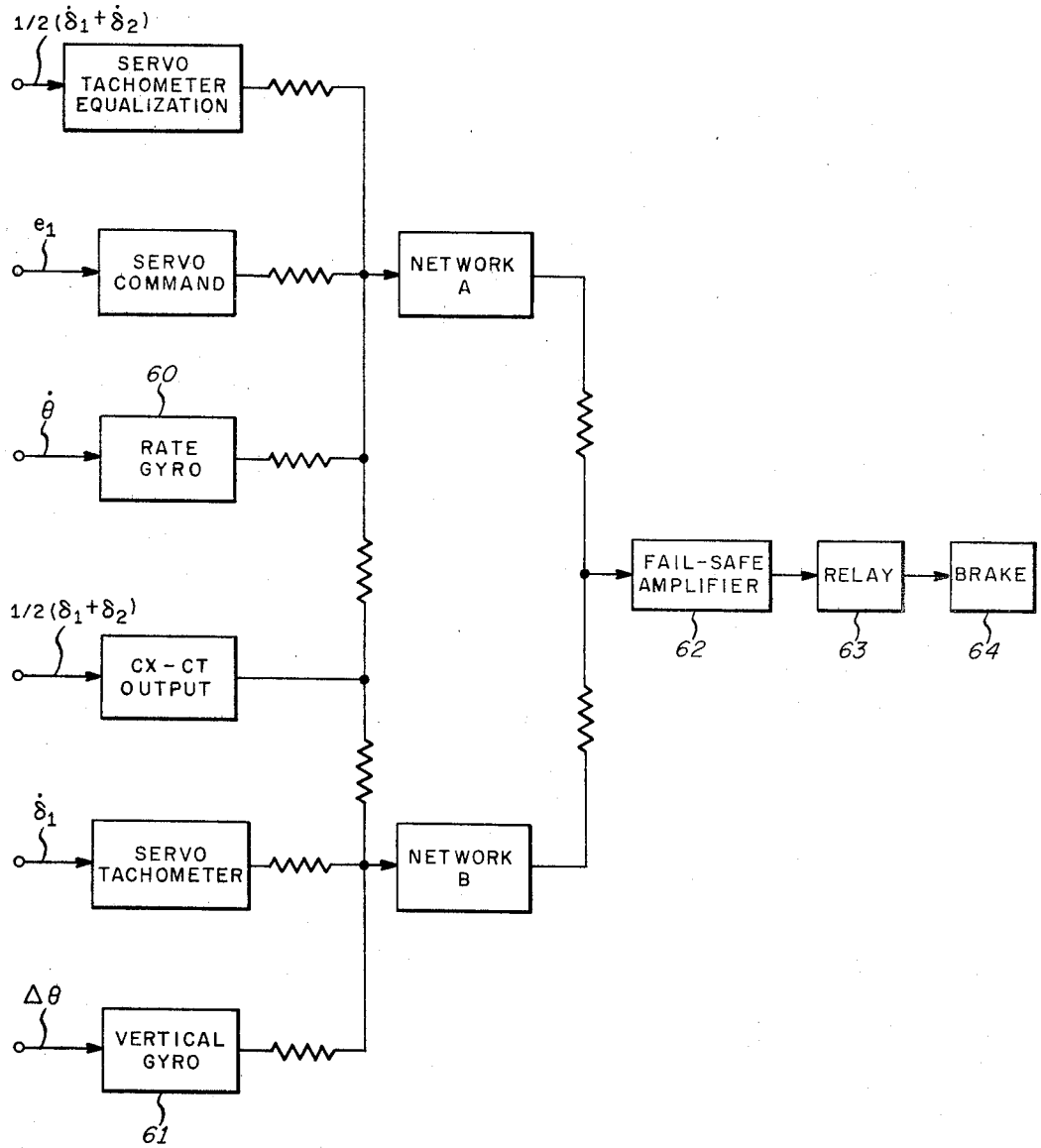
FIG. 3 is a schematic diagram in block form of a typical monitor apparatus suitable for use with the present invention.

The monitors 40 and 41 of FIGS. 1 and 2 may be generally of the type shown in FIG. 3 utilizing independent electronic channels to compare servo commands with servo responses. The commands are designated $e_1$ and $e_2$ while the responses are designated $\delta_1$ and $\delta_2$ and $\dot\delta_1$ and $\dot\delta_2$. If it is assumed that the servo is a linear second order dynamic system and also that the applied torque is proportional to the electrical command, the following relationship is applicable:

$$\text{Applied torque}=J\ddot\delta_1+D\dot\delta_1+k(\delta_1+\delta_2)=Ke_1 \quad (1)$$

where:
$J$=angular moment of inertia of the servo as reflected at the $\delta_1$ shaft—

$$\frac{\text{pound-inches}}{\text{rad/sec.}^2}$$

$\ddot\delta_1$=angular acceleration of servo shaft—rad/sec.$^2$
$D$=viscous damping constant—

$$\frac{\text{pound-inches}}{\text{rad/sec.}}$$

$\dot\delta_1$=angular velocity of servo shaft—radians/second
$k$=spring constant of output load—

$$\frac{\text{pound-inches}}{\text{radian}}$$

$(\delta_1+\delta_2)$=deflection of output shaft—radians
$K$=forward gain of servo—

$$\frac{\text{pound-inches}}{\text{volt}}$$

$e_1$=electrical servo command—volts

The rate gyro 60 and the vertical gyro 61 are compared to provide an independent comparison of the attitude senses, i.e., vertical gyro and rate gyro. The remaining inputs are designed to simulate dynamic of the second auto servo explained above.

Networks A and B have transfer functions:

$$A=\frac{KS}{(\tau_1S+1)(\tau_2S+1)(\tau_3S+1)} \quad (2)$$

$$B=\frac{KS^2}{(\tau_1S+1)(\tau_2S+1)(\tau_3S+1)} \quad (3)$$

from which it is seen that:

$$B=SA$$

where $S=d/dt$ and K, $\tau_1$, $\tau_2$, $\tau_3$ are constants which describe the gain and band pass characteristics of the networks.

The polarities of the signals through the networks A and B are such as to cancel each other when the servo is operating in a valid manner. If the outputs of networks A and B do not cancel each other, the difference is amplified in fail-safe amplifier 62 and used to release a relay 63 which releases the servo brake 64.

The rate gyro signal $\theta$ enters only the network A while vertical gyro signal $\Delta\theta$ enters only the network B. During normal operation the output from the network A due to the rate gyro will cancel the output from the network B due to the vertical gyro since the transfer function of network B is the exact derivative of network A. If either the rate gyro or the vertical gyro should fail, or, for that matter, network A or network B should fail, it will disrupt the balance and causes the brake 64 to be applied.

A balance of the remaining electrical inputs to networks A and B under normal operating conditions will be achieved if the electrical signals simulate the dynamic elements indicated in Equation 1.

An electrical simulation of $J\ddot\delta_1$ consists of the derivative of the servo tachometer. This is implemented by feeding the servo tachometer output to network B through a proper input summing resistor.

An electrical simulation of $D\dot\delta_1$ consists of the summation of the derivative of $\frac{1}{2}(\delta_1+\delta_2)$ plus $\frac{1}{2}(\dot\delta_1-\dot\delta_2)$, thus:

$$D\dot\delta_1=D\left[\frac{1}{2}\frac{d}{dt}(\delta_1+\delta_2)+\frac{1}{2}(\dot\delta_1-\dot\delta_2)=D\dot\delta_1\right] \quad (4)$$

This is implemented by feeding the servo tachometer equalization signal to network A and the CX–CT synchro output to network B.

An electrical simulation of $k(\delta_1+\delta_2)$ consists of adding the CX–CT output through network A. It should be noted that the steady state output of the servo system reflects a controlled deflection of the output drive which is the sum of the individual servo positions. Under steady state conditions the command voltage, $e_1$, will be cancelled by the resilient restraint of the output drive shaft. This explains the use of $k(\delta_1+\delta_2)$ in the dynamic Equation 1.

As noted previously, the network constants of Equations 2 and 3 will determine the frequency band over which the monitor will be effective.

It should be emphasized that Equation 1 reflects electrical servo damping and equivalent electrical spring loads as well as mechanical servo damping and resilient loads. That is, a portion of the electrical command, $e_1$, is cancelled by electrical feedbacks from the tachometer and the CX–CT synchros. As a matter of fact, the greater part of the velocity and displacement elements are electrical, rather than mechanical. It is this fact which makes electrical monitoring practical since it is failures in the forward gain elements and the electrical feedbacks which will cause disruption of the electrical balance between the signals through networks A and B.

The failure characteristics of the present invention will now be considered with respect to a hard-over failure of one of the two servo channels and then a passive failure of one servo channel followed by a hard-over failure in the second servo channel. It will be appreciated that the failure characteristics of the present invention come about because the addition of the servo motions is consummated at a reversible point in the over-all flight control servo loop. A hard-over failure of one of the servo channels will result in merely a slight disturbance of the control surface, because the minor loop feedback of the operational channel will cancel the servo loop of the failed channel. The action of the operational channel is very rapid since the minor loop is the responsive element. A passive failure of one of the servo channels followed by a hard-over failure of the second channel will also result in merely a slight disturbance of the control surface since the failed servo channel cannot apply significant torque to the surface. This is because there is negligible reaction from the reversible channel that has had a passive failure since the hard-over channel will rotate the passive failed servomotor in an opposite direction.

By utilizing monitors, for example, of the type disclosed in FIG. 3, fail-operational characteristics may be provided. Then, should either monitor detect a malfunction it will operate to apply the brake of the deflection channel allowing the valid channel to continue to operate. Since each servo feedback signal reflects the actual deflection of the servo drive output which consists of the sum of the individual servo loops $(\delta_1+\delta_2)$ there is no requirement to change the forward gain of the operating channel when the failed channel is clamped.

Further, maximum torque is essentially unchanged when one channel is operating alone or in conjunction with the other. The servo drive output shaft will only be supjected to the weaker of the two servomotor torques when operating in a dual configuration.

While the invention has been described in its preferred embodiments, it is to be understood that the words which have been used are words of description rather than limitation and that changes within the purview of the appended claims may be made without departing from the true scope and spirit of the invention in its broader aspects.

I claim:

1. A control system for controlling the movement of a common positionable member comprising, first and second substantially identical signal responsive servo channels for providing first and second outputs, respectively, differential gear means responsive to said first and second outputs and coupled between said first and second servo channels and said common positionable member at a reversible point in said control system, position feedback means responsive effectively to the movement of said differential gear means for providing position feedback signals to said first and second servo channels, and rate feedback means responsive effectively to the movement of said differential gear means for providing rate feedback signals to said first and second servo channels whereby said first and second outputs tend to be equalized.

2. A control system of the character recited in claim 1 in which said position and rate feedback signals are connected in feedback fashion to their respective servo channels.

3. A control system of the character recited in claim 1 in which said position feedback signals comprise first and second position feedback signals representative of the movement of first and second portions respectively of said differential gear means and the sum of said first and second position feedback signals is connected in feedback fashion to each of said servo channels, and said rate feedback signals comprise first and second rate feedback signals representative of the movement of said first and second portions and the difference of said first and second rate feedback signals is connected in feedback fashion to each of said servo channels.

4. A control system of the character recited in claim 1 in which said position and rate feedback means for said first servo channel is excited by a first power supply and said position and rate feedback means for said second servo channel is excited by a second power supply.

5. A control system of the character recited in claim 3 in which said position and rate feedback means for providing said first summed position and first difference rate signals is excited by a first power supply and said position and rate feedback means for providing said second summed position and said second difference rate signals is excited by a second power supply.

6. A control system of the character recited in claim 1 further including monitoring means responsive to malfunction of either of said first and second servo channels for clamping that portion of said differential gear means normally responsive to said malfunctioning servo channel whereby the remaining servo channel automatically individually controls said member.

7. A control system of the character recited in claim 1 in which said differential gear means includes first and second input gears responsive to said first and second outputs respectively, and further including first and second monitoring means responsive to the operation of said first and second servo channels and coupled to said first and second input gears respectively for selectively clamping the input gear associated with a malfunctioning channel for rendering said malfunctioning channel ineffective while permitting the other channel to control said member.

8. A control system of the character recited in claim 7 in which said differential gear means normally has a 2:1 gear reduction between each of said first and second servo channels and its output during normal operation with each of said first and second servo channels being automatically equalized to transmit approximately one-half the total torque.

9. A control system of the character recited in claim 8 in which during malfunction, clamping of said input gear associated with said malfunctioning channels results in a 1:1 gear reduction with the properly functioning channel transmitting the total torque through said differential gear means thereby minimizing transients due to malfunction.

References Cited
UNITED STATES PATENTS

| | | | |
|---|---|---|---|
| 2,411,147 | 11/1946 | Cooley | 318—28 XR |
| 2,480,065 | 8/1949 | Wanner | 318—13 XR |
| 3,136,698 | 6/1964 | Mann | 318—19 XR |
| 3,143,693 | 8/1964 | Fearnside | 318—28 XR |
| 3,189,886 | 6/1965 | Sonntag | 318—13 XR |

BENJAMIN DOBECK, Primary Examiner

U.S. Cl. X.R.

318—28, 30